Figure 1:
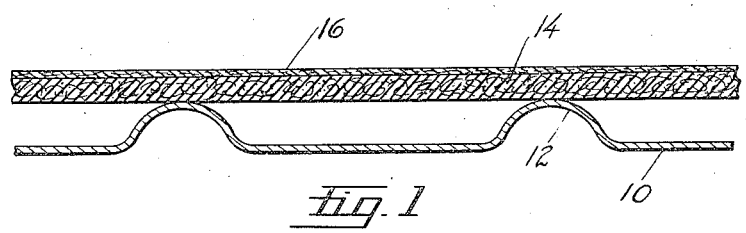

Dec. 13, 1938.  G. R. CUNNINGTON  2,139,882

FLOOR STRUCTURE

Filed Jan. 7, 1937

INVENTOR.
GEORGE R. CUNINGTON
BY
Parker & Burton
ATTORNEYS

Patented Dec. 13, 1938

2,139,882

UNITED STATES PATENT OFFICE 2,139,882

FLOOR STRUCTURE

George R. Cunnington, Detroit, Mich., assignor to Woodall Industries Incorporated, Detroit, Mich., a corporation of Michigan Application January 7, 1937, Serial No. 119,414

20 Claims. (Cl. 154—2)

My invention relates to an improved laminated insulating structure and to an improved method of fabricating such a structure.

This application is a continuation in part of my application Serial No. 76,105, filed April 24, 1936.

An object is the provision of an improved sheet of insulation material which possesses the capacity under predetermined conditions, as, for example, a predetermined temperature, of permanently securely adhering itself to a supporting surface without the employment of additional or other adhesive than that contained in the insulation sheet itself and without the employment of pressure to obtain the adhesion.

One primary use for such a sheet is to insulate the sheet metal wall sections of an automobile body against the transmission or production of undesirable noise. A particular use in question is the insulation of the sheet metal floor of an automobile body through securement of this improved insulation thereto, however the insulation might be applied to other metal wall sections of the body as desired.

This improved insulation sheet is thermoplastic and possesses not only the capacity of adhering itself securely to a supporting wall but possesses also the capacity and flexibility during such adhesion of wilting to conform to an irregularly contoured supporting wall in order that adhesion may occur throughout substantially the entire expanse of covered wall area.

In use the insulation sheet is adhered to a metal or other supporting sheet by self-adhesion and the complete assembly is made up of the supporting sheet and the laminated thermoplastic insulation sheet attached thereto and serving to prevent or at least minimize transmission or generation of sound vibration through or by such supporting sheet.

It has heretofore been proposed to adhesively secure a sound deadening layer of composition material to a sheet of metal by the application of a coating of adhesive to one surface of the metal or to one surface of the sound deadening layer or both and thereafter to adhere said composition layer and metal sheet together through the use of said coating. This is a messy and expensive operation and considerable difficulty has been experienced by this practice in obtaining a permanently secure bond or joint between the composition layer and the metal sheet. The composition layer and the metal sheet possess widely varying characteristics in response to temperature changes and vibration and there is a tendency for a bond so formed to break under these varying conditions. Breakage of the adhesive bond prevents the sound deadening composition layer from effectively serving to damp out vibration of the metal.

I propose to adhesively secure a fibrous asphaltic composition layer to a supporting sheet, such as a metal sheet, in such a manner that the bond formed therebetween will resist rupture notwithstanding sudden changes in temperature or vibration to which the material may be subjected. The adhesive joint between the composition layer and the metal is not an independent joint structure but is an integral part of the composition layer itself possessing the same characteristics as such layer and reaching into the interior of such layer. It results from a draining down out of such layer of adhesive material which forms the bond with the metal sheet. My composition layer might be said to be welded, as it were, to the metal sheet. Such adhesive securement is accomplished through fusing of the composition layer to the metal under the influence of heat which causes the binder of the composition layer to flow or spew down onto the metal adhesively attaching itself thereto. The heat also causes the composition layer to expand and form a multiplicity of porosities in the composition layer.

More particularly my improved insulation sheet comprises a layer of asphaltic mastic carrying a fibrous filler. Under a predetermined temperature the asphaltic binder in this mastic layer is adapted to fuse and to flow, discharge or spew from one surface and adhere to a supporting surface. The opposite surface of the mastic layer is adapted to resist the flowing or spewing of asphalt therethrough from the layer. This resistance to spewing of asphalt may be provided by the employment of an overlying adhered protective lamination impervious or resistant to the flow of asphalt therethrough from the mastic layer. This impervious surface lamination is itself normally non-sticky, flexible, tough and securely attached to the mastic layer. The flowing or spewing of asphalt from the mastic layer must therefore occur through the opposite surface of the mastic layer which opposite surface is the one that juxtaposes the supporting surface.

As this asphaltic mastic layer is adapted to wilt under the influence of the heat required for adhesion to conform to the contour of the supporting surface, the surface lamination of the asphalt layer which resists the spewing of asphalt is sufficiently flexible not to restrain such wilting.

Preferably this mastic layer possesses the further capacity of blowing or expanding during its adhesion and in response to the heat which produces adhesion. This expansion, puffing or blowing which is a permanent structural change, produces voids or porosities in the layer which renders it more suitable for its intended insulation use.

In the application of this insulation sheet material to a supporting wall the sheet material is cut to size to cover the particular wall area desired to be covered thereby. The insulation sheet is then placed upon this particular area of the supporting wall with the surface of the mastic layer through which the flow of asphalt occurs disposed in juxtaposition with the supporting wall. This supporting wall is then subjected to sufficient heat for a sufficient length of time to produce conforming wilting of the mastic layer upon the supporting layer and fusing of the asphalt therefrom to produce adhesion of the mastic layer with the supporting wall. The heat is continued for such a protracted period of time as is sufficient to heat the mastic layer throughout and to produce the wilting and adhesion described.

In the manufacture of automobile bodies this insulation sheet is preferably placed in position upon its supporting metal wall of the body before the automobile body goes through the heat treating ovens employed in the finishing of the body. As a result of passing the body through such an oven this insulation sheet wilts into conformity with and adheres itself to the supporting wall upon which it has been placed. The automobile body is subjected to the heat of such ovens for a period of thirty minutes to an hour during which the asphaltic mastic is heated thoroughly throughout. The heat of such ovens may vary from 180° to 240° F.

As an insulation treatment the composition layer is moisture resistant and does not change its characteristics during use. As a floor treatment the insulating layer not only serves to insulate the sheet metal floor but also provides a sound deadening cushion tread layer overlying the floor underneath the floor mat.

Figure 2:
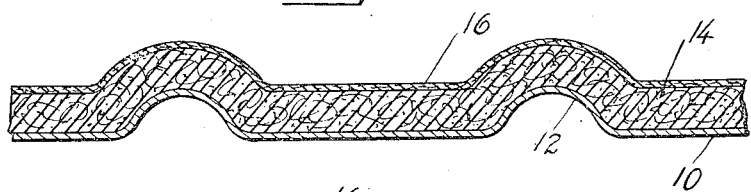
Figure 3:
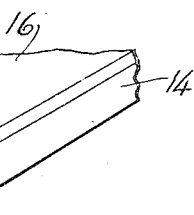
Figure 5:
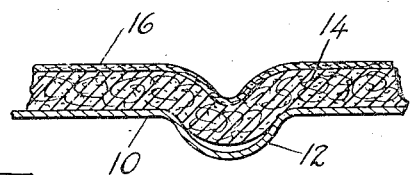
Figure 4:
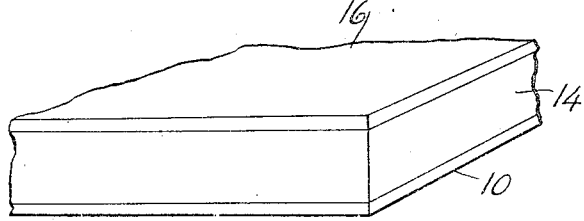

Other objects, advantages and meritorious features of my invention will more fully appear from the following specification, appended claims and accompanying drawing, wherein:

Figure 1 is a cross-sectional view through the several laminations which go to make up my improved laminated panel during an intermediate stage in the fabrication of the panel, Fig. 2 is a cross-sectional view taken on the same line as Fig. 1 showing the completed panel, Fig. 3 is a perspective of a fragment of the composition layer before it is fused to the metal sheet, Fig. 4 is a perspective of the fragment illustrated in Fig. 3 following its expansion due to the application of heat thereto and showing the same adhesively secured to the metal lamination, and Fig. 5 is a cross-sectional view through a laminated panel embodying my invention wherein the metal lamination is of a slightly modified form as compared with the form as illustrated in Figs. 1 and 2.

My invention relates to an insulation treatment which is particularly intended to deaden the drumming or vibration of metal panels and is particularly useful in connection with the insulation of metal panels such as are employed in automobile body construction and specifically those metal panels used as floor panels.

In Figs. 1, 2 and 5 the metal panel or lamination is indicated as 10. In Figs. 1 and 2 the metal lamination 10 is shown as ribbed or corrugated with upwardly projecting ribs or corrugations 12 and in Fig. 5 the ribs 12 project downwardly forming a groove or channel open on the upper surface of the panel. These ribs reenforce, strengthen and stiffen the panel. I provide an improved layer of composition insulation material which is adhesively fused to the metal panel to deaden the vibration thereof and to provide an improved laminated insulating structure as hereinafter described.

The improved laminated insulation sheet comprises a layer of asphaltic mastic 14 to which protective surface lamination 16 is secured. The asphaltic mastic layer is made up of filler fibers held together by an asphalt composition binder. Different kinds of filler fibers may be employed. Different kinds of asphalts may be employed.

Filler fibers which have been found suitable are reclaimed automobile tire fibers. These reclaimed tire fibers from which the rubber has been in large part removed are, in a form found most suitable, short lengths of coarse cord fibers. Though the rubber has been reclaimed the fibers still carry from 5% to 15% by weight of rubber stock adhered thereto. This adhered rubber residue comprises rubber and small particles of other ingredients used in the manufacture of the tires.

Other types of fibers may be employed. Fibers not carrying any rubber may be employed. Oat hulls may be used as a fiber filler. Preferably the fibers should be relatively non-absorbent of the asphalt. The presence of the rubber content on the fibers above described renders them resistant to saturation by asphalt. Preferably also the fibers should be coarse inherently resilient and springy.

The asphalt and filler fibers are mixed together in proportions which will insure an excess of asphalt in the mastic sheet. By excess of asphalt is meant that there is present in the mastic sheet asphalt in excess of that taken up by the fibers in their saturation and required for bonding the fibers together. Through such excess of asphalt the mastic sheet is bonded to a supporting sheet. A preferred proportion, with the reclaimed tire fibers above specified, is approximately 20% of fibers and 80% of asphalt by weight. Depending upon conditions and the character of the materials the asphalt would constitute 50% to 85% by weight of the mastic sheet.

Fibrous filler is provided however in sufficient quantity and the excess of asphalt is so limited as to restrain the asphalt, at the temperature at which adhesion occurs, from flowing and spreading out over the surface of the supporting sheet as the asphalt, without such restraint, would do. The movement of the asphalt is confined by the fibers to flowing or draining or spewing down and adhering upon the area of the sheet covered by the asphaltic mastic layer. With fibers and asphalts commonly employed the asphalt would generally constitute 65% to 85% by weight of the mastic. Though the asphalt constitutes the major portion of the mastic by weight as hereinabove set forth, the filler particles or fibers constitute a far larger proportion thereof by bulk or volume than is indicated by the relative weight of the asphalt and filler employed. Asphalt weighs approximately eighty pounds per cubic foot. Reclaimed tire fibers weigh approximately ten to fifteen pounds per cubic foot and oat hulls weigh approximately ten pounds per cubic foot. Compared to the asphalt, therefore, the light weight bulky filler fibers or particles, even though present only to the extent of fifteen percent by weight in the mastic, constitute a substantial proportion of the volume thereof.

Oat hulls might perhaps properly be termed bulk or structure forming filler particles rather than fibers, for they do not exhibit the fine thread like character of the reclaimed tire fibers and wherever the term "fibers" or "filler fibers" is used to describe the filler or bulk forming constituent of the mastic or wherever the term "fibrous" is used to describe the asphaltic mastic such term is intended to include the loose bulky or structure forming filler material whether the same is present as particles, such as oat hulls, or as thread like fibers, such as reclaimed tire fibers.

As adhesion is generally sought at relatively low temperatures, by which is meant temperatures varying between 180° and 240° F., the asphalt employed is preferably a low melting point asphalt. For use as an insulation for metal wall areas of an automobile body asphalts having a melting point of 200° F. or lower would preferably be employed. In connection with the particular use above specifically referred to it has been found desirable to employ asphalts having a melting point as low as 140° F. and varying therefrom up to 170° F.

In the fabrication of the mastic layer, prior to its adhesion to a supporting surface, the fibrous filler and hot fluid asphalt are mixed together in a mixing vat. Preferably water is added to the fibers before the hot asphalt is added thereto. The water saturates the fibers prior to the mixing of the fibers with the hot asphalt. Following the addition of the water to the fibers fluid asphalt at a temperature of 400° to 500° F. may be added. Some of the water will evaporate upon the addition of the hot asphalt, however, sufficient water is added so that after the fabrication of the mastic sheet is complete it will still possess a water content by weight which will exceed 1% and may vary from 1% to 7%.

The addition of the water is believed to subserve an important purpose in reducing the absorption capacity of the fibers for asphalt. The fibers being saturated with water will not take up the asphalt as they would if unsaturated. The presence of the rubber content on the fibers also serves this same purpose. The addition of the water is also believed to subserve another important purpose in connection with the securement of the mastic layer to a supporting sheet as is hereinafter more fully described.

The fibers are mixed loose and at random throughout the asphaltic mass. They are supported and positioned within the mastic by the asphaltic binder. Such a structure is substantially different from what would result if a sheet of fibrous felt or fibers otherwise integrated into sheet form were, as a sheet, subjected to an asphaltic bath as in the manufacture of roofing felt. Though the mastic layer here formed has a sheet form this is not the result of the fibers having such sheet form independently of the asphalt.

The asphaltic fibrous mass after removal from the mixing vat is passed through an extruding machine which gives it the sheet form. After leaving the extruding machine, at which time the temperature may have dropped to 160° F., the sheet is passed between calender rolls which compact and compress it forming a relatively dense well formed asphaltic mastic sheet. As the asphaltic mastic goes between the calender rolls a sheet of tough flexible material such as asphalt saturated felt, tough, strong, flexible, non-tacky and non-adhesive, or a sheet of rubber cellulose material, such as is sold commercially under the trade name Lexide (a latex saturated cellulose sheet), is brought into juxtaposition with one surface of the mastic layer and adhered thereto by being compressed thereagainst as the two layers pass between said rolls.

This compacted laminated sheet comprises the fibrous asphaltic mastic layer 14 and the outer surface lamination 16. It is cut to the proper size for the use to which it will later be put. The outer surface lamination 16 is tough, flexible, moisture resistant and adapted to prevent flowing or spewing of the asphalt from the mastic layer therethrough. This outer layer 16 if an asphalt saturated felt sheet, will not discharge or spew asphalt at the temperature of adhesion and will not adhere to a supporting surface. It forms a flexible non-sticky protective covering. Such a sheet is relatively impervious. Upon heating of the mastic layer throughout as described above the asphalt flows or drains downwardly or spews out from the face of the mastic layer juxtaposing the supporting sheet onto such sheet. It will not spew through the protective covering 16 at any temperature to which it will be subjected to produce adhesion.

The metal panel 10 may be considered as a sheet metal floor of an automobile body. The composition layer is placed thereon but is not necessarily compressed or packed down thereagainst. The metal sheet 10 with the composition layer supported thereupon is then subjected to heat treatment sufficient to cause the asphalt binder in the composition layer to flow.

When the composition layer is used as a treatment for an automobile floor it is placed thereon before the automobile body is subjected to heat during the surface finishing of the body. In the finishing of an automobile body it is subjected to heat which may equal 240° F. Normally such heat treatment temperature may vary from 200° to 240° F. This heat causes the asphalt to flow and move down out of the composition layer onto the sheet metal floor 10. This fused asphalt collects and densifies upon the metal floor and adhesively secures the composition layer thereto. This adhesive securement of the composition layer to the metal sheet is particularly tight and secure and extends throughout the entire contacting surface areas of the metal lamination and the composition layer.

Under the heat of adhesion the composition layer wilts against the metal sheet and conforms generally to the contour thereof forming a secure adhesive connection therewith not only on the upwardly projecting ribs or ridges 12 of Figs. 1 and 2 but also over the intermediate portions between said ribs. The same is true of the construction shown in Fig. 5 though the composition layer would not ordinarily fall down and completely fill the relatively narrow groove 12 shown in Fig. 5 but it will fall thereinto sufficiently to form a secure bond of adhesion therein.

In addition to the heat causing the asphalt to flow down and securely engage the metal sheet it also causes the composition layer to expand to a substantial degree. During this expansion it decreases substantially in density. To what extent this decrease in density and increase in thickness and porosity is due to the flowing down of the asphalt, leaving voids in the layer, or due to the blowing of some of the ingredients is a matter of conjecture but it is to be noted that the composition layer increases very materially in thickness following the application of heat thereto. A layer 1/16" thick may increase during heat treatment 1/8" in thickness. To this degree of increase in thickness the layer increases in porosity and decreases in density.

During the adhesive securement of the mastic sheet to the supporting metal floor the mastic sheet rests upon the supporting surface by its own weight and it is therefore free to expand in response to the various forces tending to produce expansion. This expansion and the forces tending to produce it also assist the movement of the asphalt in draining or spewing down upon the supporting sheet.

If the adhesion temperature is above the boiling point of water the production of steam from the water in the saturated fibers not only produces or increases the puffing or expansion of the mastic layer but facilitates, it is believed, the draining or spewing down of the asphalt therefrom. It is thought that this may be true even though the temperature does not reach 212° F. Water vaporization occurs at temperatures below 212° F. and this vaporization creates a pressure which not only expands the sheet but increases the spewing of asphalt therefrom. It therefore facilitates adhesion.

Specific low temperature gas producing ingredients other than water may be added to the mix. Ingredients may be added which would produce gas at temperatures below the boiling point of water. A low boiling point alcohol might be added. Certain chemical salts such as ammonium sulphate may be added followed by the later addition of sodium nitrate.

This addition would necessarily be a delayed addition to the mass after the fluid asphalt had cooled sufficiently below the temperature at which it was inserted as not to evaporate such gas forming ingredients out of the mass. These gas producing agents to have the desired effect should of course be gas producing at temperatures within the range at which adhesion was desired and below the complete fluidity point of the asphalt as it is not satisfactory to have the asphalt flow and run out over the supporting surface beyond the margin of the mastic sheet. While it is desirable to facilitate the draining or spewing down of asphalt to obtain proper adhesion its flow should be confined to the mastic covered area.

When the asphaltic mastic layer has been heated thoroughly throughout the asphalt is rendered mobile and the fibers if springy and resilient, tend to spring back and increase the thickness of the lamination. This fiber movement tends also to produce a movement of the asphalt particles assisting spewing and producing voids and facilitating adhesion. The filler fibers have been, due to the compression of the mastic layer during its fabrication as heretofore described, compacted down and have been held so constrained by the asphaltic binder. As this binder is rendered mobile under the influence of the heat of adhesion of the layer to the supporting surface these fibers are released for movement and are permitted to readjust their relative position to assist expansion of the sheet and to maintain it in the expanded state and to facilitate asphalt movement for adhesion.

The relative non-absorbent character of the fibers is believed also to increase the tendency of the asphalt to flow downwardly rather than be absorbed by the fibers. An excess of asphaltic binder for adhesion is insured. As the lamination 16 is impervious to the flowing or spewing of asphalt therethrough the asphalt will move only through the opposite surface of the layer and through such surface it moves down onto the supporting sheet and adheres itself securely thereto. Such a sheet so constituted not only serves to deaden the vibration of the metal layer but provides a porous mass of relatively inert material adhesively secured to the metal sheet by a relatively dense asphaltic bond produced by the down flow or spewing of asphalt from the composition layer fusing on the metal sheet. Above the relatively dense asphalt adherent bond the composition layer possesses a decreased density and a porosity which causes it to serve particularly well the function of an insulation layer. The composition layer forms an inert, relatively dead, heavy, plastic lamination adhesively bonded in overlying relationship to the metal sheet by adhesive binder drained down out of the composition layer forming a secure adhesive connection between the composition layer and the metal sheet.

What I claim is:

1. That method of fabricating a laminated insulation structure comprising placing a layer of composition material consisting of a multiplicity of fibers held together by an asphaltic compound and carrying a rubber content upon a sheet of metal and subjecting such laminated structure to heat sufficient to cause the composition layer to blow to an increased thickness and to cause the asphalt to flow out of the layer onto the metal sheet forming porosities within the layer and adhesively securing it to the metal.

2. That method of fabricating a laminated insulation structure comprising compacting a fibrous asphaltic mastic layer wherein the fibers are disposed at random and positioned by the asphaltic binder sufficiently to place the fibers under tension maintained by the binder, placing said compacted layer upon a sheet of material to which it is to be adhered and subjecting the same to such a temperature as to heat the mastic layer throughout sufficiently to render the asphalt so mobile as to partly release the tension of said fibers permitting the sheet to expand and to cause the layer to spew asphalt from the surface juxtaposing such sheet adhering the layer thereto.

3. That method of fabricating a laminated insulation structure comprising compacting a fibrous asphaltic mastic layer, placing said compacted layer upon a sheet of material to which it is to be adhered and subjecting the same free from pressure against such sheet to such a temperature as to heat the mastic layer throughout sufficiently to cause it to spew asphalt from the surface juxtapositioning said sheet, upon said sheet, adhering the layer thereto and to cause the layer to expand to an increased thickness over that to which it was compacted.

4. That method of fabricating a laminated insulation structure comprising placing a fibrous asphaltic mastic layer containing a gas producing agent, said layer having one surface adapted to permit spewing and the opposite surface adapted to resist spewing of the asphalt therethrough from the layer, upon a sheet of material to which the layer is to be adhered with the surface adapted to spew asphalt juxtaposing such sheet and subjecting the same to heat sufficient to cause the gas producing agent to produce gas and sufficient to cause the layer to spew asphalt through said juxtaposed surface onto the supporting sheet adhering the layer thereto.

5. A laminated insulation structure comprising a sheet of metal and a layer of composition material including a multiplicity of fibers held together by an asphaltic binder constituting by weight at least twice the weight of the fibers, said composition layer adhesively secured to the metal sheet by asphalt flowing therefrom onto the metal, said layer having a multiplicity of porosities formed therein during flowing of the asphalt therefrom.

6. A laminated insulation structure comprising a sheet of metal and a layer of composition material including a multiplicity of reclaimed disintegrated tire textile fibers carrying a small residual rubber content of not to exceed 20% by weight of the textile fibers and held together by an asphaltic binder present in a substantially greater amount by weight than the amount of tire fiber stock, said composition layer being adhesively secured to the metal sheet by adhesion of the asphaltic binder thereto, said composition layer being expanded under the influence of heat applied thereto during its adhesion to the metal sheet forming a multiplicity of porosities therein.

7. A laminated insulated floor element comprising a metal sheet and an overlying layer of composition material consisting of a multiplicity of disintegrated textile fibers carrying less than 20% by weight of rubber composition material and held together by an asphalt compound present in an amount of three to four times the amount by weight of the textile fibers, said composition layer being adhesively secured to the metal sheet by asphalt compound flowed from the composition layer onto the metal sheet, said composition layer being expanded and rendered porous by the influence of heat applied thereto while the same is being fused to the metal sheet.

8. A laminated structure comprising a sheet of foundation material and a layer of asphaltic mastic having structure forming filler particles scattered throughout an asphaltic mass and held together thereby and wherein the asphalt present in the layer exceeds the amount required for bonding said filler particles together and for absorption thereby, said mastic layer juxtaposing said sheet and being adhered thereto by asphalt spewed from the juxtaposed surface of the layer onto the sheet during application of heat throughout the body of the mastic layer, the opposite surface of the layer being provided with a barrier resistant to the spewing of asphalt therethrough.

9. A laminated structure comprising a sheet of foundation material and a layer of asphaltic mastic having structure forming filler particles scattered throughout an asphaltic mass and held together thereby and wherein the asphalt present in the layer exceeds the amount required for bonding said filler particles together and for absorption thereby, said mastic layer juxtaposing said sheet and being adhered thereto by asphalt spewed from the juxtaposed surface of the layer onto the sheet, the opposite surface of the layer being provided with a lamination of material adhered thereto, said lamination of material being resistant to the spewing of asphalt therethrough from the layer.

10. A laminated insulation sheet comprising a layer of fibrous asphaltic mastic responsive under the influence of heat to spew asphalt and having one surface pervious to the spewing of asphalt therethrough, and having a lamination of material resistant to the spewing of the asphalt therethrough adhered to the opposite surface of said layer.

11. A laminated sheet comprising a lamination of fibrous asphaltic mastic wherein the fibers carry a small rubber content and a lamination of latex saturated cellulose material adhered to one surface of the mastic lamination.

12. That method of fabricating a laminated structure comprising mixing loose structure forming filler particles throughout an asphaltic mass wherein the asphalt present substantially exceeds the asphalt absorption capacity and requirement for bonding of the filler particles forming an asphaltic mastic layer, providing one surface of said mastic layer with a barrier adapted to resist the spewing of asphalt therethrough from the mastic while leaving the opposite surface of the mastic layer permeable to the spewing of asphalt therethrough, placing said mastic layer on a sheet of material to which it is to be adhered with the spew permeable surface of the mastic juxtaposing said sheet and subjecting the same to heat throughout above the melting point of the asphalt for a sufficient time to cause asphalt to spew from the mastic onto the sheet adhering the mastic thereto.

13. That method of fabricating a laminated structure comprising mixing loose filler particles throughout an asphaltic mass wherein the asphalt present substantially exceeds the asphalt absorption capacity and requirement for bonding of the filler particles forming an asphaltic mastic, placing said mastic on a sheet of material to which it is to be adhered and subjecting the superposed layers to heat above the melting point of the asphalt for a sufficient time to cause asphalt to spew from the surface of the mastic juxtaposing said sheet upon the sheet adhering the mastic thereto.

14. That method of fabricating a laminated structure comprising mixing loose filler material throughout an asphaltic mass of at least twice the weight of the filler to form an asphaltic mastic carrying an excess of asphalt over and above the absorption capacity and requirement for bonding of the filler material and carrying sufficient filler content to restrain the outward spreading of the asphalt beyond the margin of the mastic upon melting of the asphalt for adhesion, placing said mastic upon a sheet of material to which it is to be adhered and subjecting the mastic throughout to heat above the melting point of the asphalt for a sufficient time to cause asphalt to spew from the mastic onto the sheet adhering the mastic thereto.

15. A laminated structure comprising a metal sheet and a layer of asphaltic mastic adhered thereto by asphalt spewed from the layer onto the metal sheet upon heating the layer throughout, said mastic layer having loose relatively springy filler material disposed throughout the asphaltic mass and held together thereby and having an asphaltic content equal by weight to at least twice the weight of the filler and in excess of the amount required for bonding the filler material together and capable of being absorbed thereby.

16. A laminated structure comprising a foundation sheet and a layer of asphaltic mastic adhered thereto by asphalt spewed from the mastic onto the sheet upon heating the layer throughout, said mastic having relatively non-absorbent filler material disposed throughout an asphaltic mass of at least twice the weight of the filler material and in excess of the amount required for bonding the filler material together and capable of being absorbed thereby.

17. A laminated structure comprising a metal sheet and a layer of asphaltic mastic adhered thereto by asphalt spewed from the layer onto the metal sheet upon heating the layer throughout, said mastic layer having light weight bulky filler particles scattered throughout an asphaltic mass and held together thereby, and wherein the asphalt in the mass is in excess of the amount required for absorption by the filler particles and required for bonding said filler particles together.

18. The invention as defined in claim 13 characterized in that an agent adapted to produce gas at the heat of adhesion of the mastic to the sheet to which the same is to be adhered is introduced into the mass forming the mastic during the formation thereof.

19. The invention as defined in claim 13 characterized in that the mastic is placed on the sheet of material to which it is to be adhered free from pressure throughout its area against said sheet other than the pressure resulting from the weight of the mastic itself permitting the mastic to blow to an increased thickness during its adhesion.

20. A laminated structure comprising a layer of metal and a layer of asphaltic mastic having structure forming filler particles scattered throughout an asphaltic mass and held together thereby and wherein the asphalt present in the mastic layer exceeds the absorption capacity of the filler particles and the amount of asphalt required for bonding said particles together, said mastic layer juxtaposing said metal layer and being adhered thereto by asphalt spewed from the juxtaposed surface of the mastic layer onto the metal layer during the heating of the juxtaposed layers throughout.

GEORGE R. CUNNINGTON.